(12) United States Patent
Akkary et al.

(10) Patent No.: US 9,798,590 B2
(45) Date of Patent: Oct. 24, 2017

(54) POST-RETIRE SCHEME FOR TRACKING TENTATIVE ACCESSES DURING TRANSACTIONAL EXECUTION

(75) Inventors: Haitham Akkary, Portland, OR (US); Ravi Rajwar, Portland, OR (US); Srikanth T. Srinivasan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1173 days.

(21) Appl. No.: 11/517,029

(22) Filed: Sep. 7, 2006

(65) Prior Publication Data

US 2008/0065864 A1 Mar. 13, 2008

(51) Int. Cl.
G06F 9/44 (2006.01)
G06F 9/52 (2006.01)
G06F 9/38 (2006.01)
G06F 9/30 (2006.01)

(52) U.S. Cl.
CPC ............ *G06F 9/52* (2013.01); *G06F 9/30087* (2013.01); *G06F 9/3834* (2013.01)

(58) Field of Classification Search
CPC ....... G06F 9/52; G06F 9/3834; G06F 9/30087
USPC ................................................. 712/225, 220
See application file for complete search history.

(56) References Cited

U.S. PATENT DOCUMENTS

| 6,216,215 | B1* | 4/2001 | Palanca et al. ................. 712/23 |
| 6,526,499 | B2 | 2/2003 | Palanca et al. |
| 6,684,398 | B2 | 1/2004 | Chaudhry et al. |
| 6,704,841 | B2 | 3/2004 | Chaudhry et al. |
| 6,718,839 | B2 | 4/2004 | Chaudhry et al. |
| 6,862,664 | B2 | 3/2005 | Tremblay et al. |
| 7,089,374 | B2 | 8/2006 | Tremblay et al. |
| 2003/0160796 | A1* | 8/2003 | Lavelle et al. ................ 345/557 |
| 2004/0162967 | A1 | 8/2004 | Tremblay et al. |
| 2004/0187115 | A1 | 9/2004 | Tremblay et al. |
| 2004/0187116 | A1 | 9/2004 | Tremblay et al. |
| 2005/0177831 | A1 | 8/2005 | Goodman et al. |
| 2006/0085588 | A1 | 4/2006 | Rajwar et al. |
| 2006/0085591 | A1 | 4/2006 | Kundu et al. |
| 2006/0161740 | A1 | 7/2006 | Crawford et al. |

OTHER PUBLICATIONS

U.S. Appl. No. 11/323,724, filed Dec. 30, 2005, Akkary et al.
U.S. Appl. No. 11/349,787, filed Feb. 7, 2006, Saha et al.

(Continued)

*Primary Examiner* — Idriss N Alrobaye
*Assistant Examiner* — Brooke Taylor
(74) *Attorney, Agent, or Firm* — Blakely, Sokoloff, Taylor & Zafman LLP

(57) ABSTRACT

A method and apparatus for post-retire transaction access tracking is herein described. Load and store buffers are capable of storing senior entries. In the load buffer a first access is scheduled based on a load buffer entry. Tracking information associated with the load is stored in a filter field in the load buffer entry. Upon retirement, the load buffer entry is marked as a senior load entry. A scheduler schedules a post-retire access to update transaction tracking information, if the filter field does not represent that the tracking information has already been updated during a pendency of the transaction. Before evicting a line in a cache, the load buffer is snooped to ensure no load accessed the line to be evicted.

15 Claims, 10 Drawing Sheets

(56) References Cited

OTHER PUBLICATIONS

U.S. Appl. No. 11/479,902, filed Jun. 30, 2006, Barnes et al.
U.S. Appl. No. 11/304,509, filed Dec. 14, 2005, Adl-Tabataba et al.
U.S. Appl. No. 11/303,529, filed Dec. 15, 2005, Adl-Tabataba et al.
U.S. Appl. No. 11/305,506, filed Dec. 16, 2005, Saha et al.
U.S. Appl. No. 11/305,634, filed Dec. 30, 2005, Saha et al.
U.S. Appl. No. 11/323,092, filed Dec. 30, 2005, Petersen et al.

* cited by examiner

POST-RETIRE SCHEME FOR TRACKING TENTATIVE ACCESSES DURING TRANSACTIONAL EXECUTION

FIELD

This invention relates to the field of processor execution and, in particular, to execution of groups of instructions.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of cores or logical processors.

The ever increasing number of cores and logical processors on integrated circuits enables more software threads to be executed. However, the increase in the number of software threads that may be executed simultaneously has created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

For example, consider a hash table holding shared data. With a lock system, a programmer may lock the entire hash table, allowing one thread to access the entire hash table. However, throughput and performance of other threads is potentially adversely affected, as they are unable to access any entries in the hash table, until the lock is released. Alternatively, each entry in the hash table may be locked. However, this increases programming complexity, as programmers have to account for more locks within a hashtable.

Another data synchronization technique includes the use of transactional memory (TM). Often transactional execution includes speculatively executing a grouping of a plurality of micro-operations, operations, or instructions. In the example above, both threads execute within the hash table, and their accesses are monitored/tracked. If both threads access/alter the same entry, one of the transactions may be aborted to resolve the conflict. Currently, tracking of accesses is done at the time of an access to the transactional memory, which potentially results in spurious transaction aborts due to accesses resulting from a mispredicted path

BRIEF DESCRIPTION OF THE DRAWINGS

The present invention is illustrated by way of example and not intended to be limited by the figures of the accompanying drawings.

FIG. 2b illustrates an embodiment of a load entry from FIG. 2a.

DETAILED DESCRIPTION

In the following description, numerous specific details are set forth such as examples of specific hardware support for transactional execution, specific tracking/meta-data methods, specific types of local/memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, specific multi-core and multi-threaded processor architectures, interrupt generation/handling, cache organizations, and specific operational details of microprocessors, have not been described in detail in order to avoid unnecessarily obscuring the present invention.

The method and apparatus described herein are for a post-retire scheme to track accesses to transactional memory during execution of transactions. Specifically, the post-retire scheme is primarily discussed in reference to multi-core processor computer systems. However, the methods and apparatus for performing post-retire transactional execution tracking are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads, that utilize transactional memory.

Figure 1:
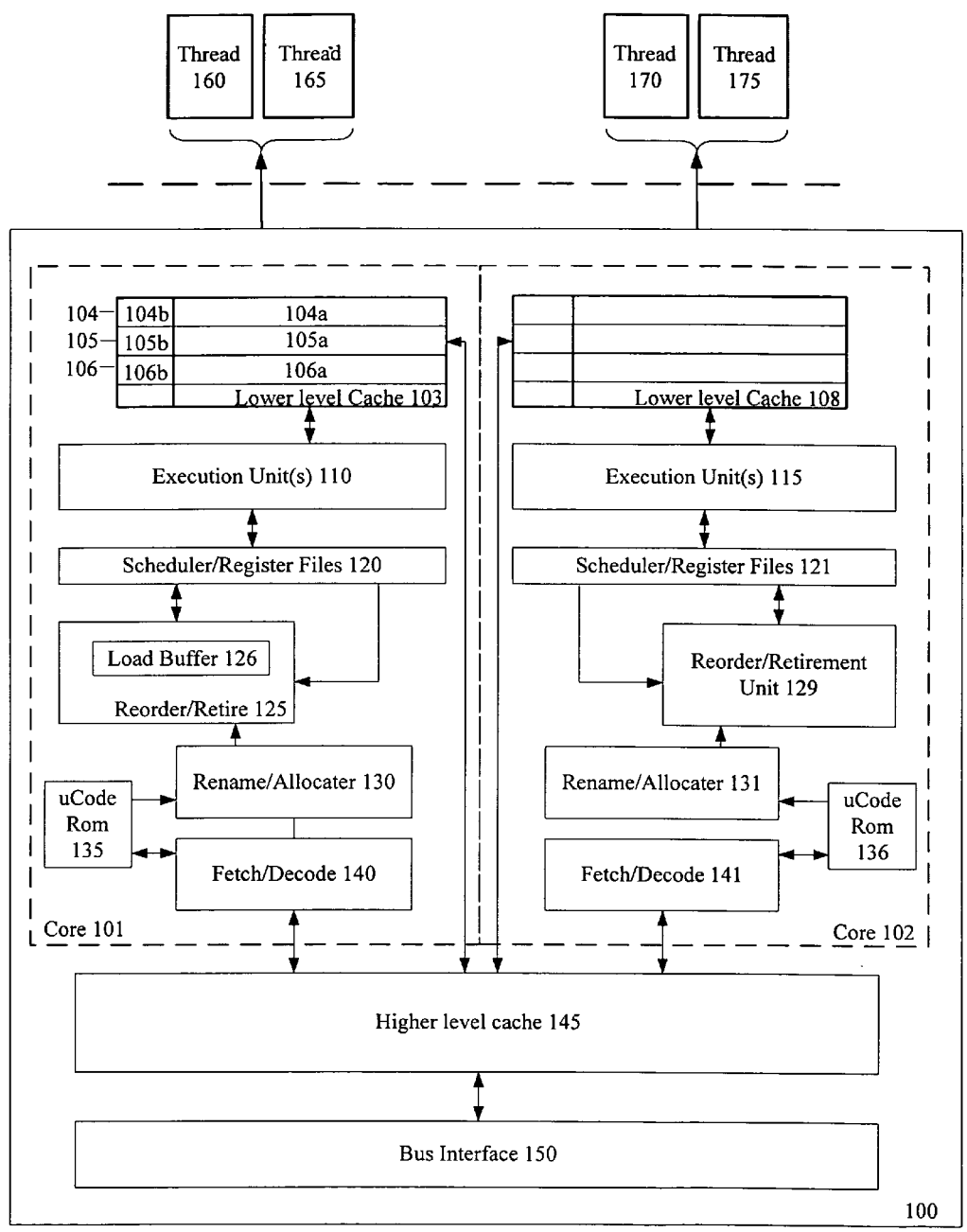
FIG. 1 illustrates an embodiment of a multi-core processor capable of performing post-retire accesses to update tracking meta-data.

Referring to FIG. 1, an embodiment of multi-core processor 100, which is capable of implementing a post-retire tracking scheme, is illustrated. Transactional execution usually includes grouping a plurality of instructions or operations into a transaction, atomic section of code, or a critical section of code. In some cases, use of the word instruction refers to a macro-instruction which is made up of a plurality of operations. There are commonly two ways to identify transactions. The first example includes demarcating the transaction in software. Here, some software demarcation is included in code to identify a transaction. In another embodiment, which may be implemented in conjunction with the foregoing software demarcation, transactions are grouped by hardware or recognized by instructions indicating a beginning of a transaction and an end of a transaction.

In a processor, a transaction is either executed speculatively or non-speculatively. In the second case, a grouping of instructions is executed with some form of lock or guaranteed valid access to memory locations to be accessed. In the alternative, speculative execution of a transaction is more common, where a transaction is speculatively executed and committed upon the end of the transaction. A pendency of a transaction, as used herein, refers to a transaction that has begun execution and has not been committed or aborted, i.e. pending.

Typically, during speculative execution of a transaction, updates to memory are not made globally visible until the transaction is committed. While the transaction is still pending, locations loaded from and written to within a memory are tracked. Upon successful validation of those memory locations, the transaction is committed and updates made during the transaction are made globally visible. However, if the transaction is invalidated during its pendency, the transaction is restarted without making the updates globally visible.

In the embodiment illustrated, processor 100 includes two cores, cores 101 and 102; although, any number of cores may be present. A core often refers to any logic located on an integrated circuit capable of maintaining an independent architectural state, wherein each independently maintained architectural state is associated with at least some dedicated execution resources. For example, in FIG. 1, core 101 includes execution unit(s) 110, while core 102 includes execution unit(s) 115. Even though execution units 110 and 115 are depicted as logically separate, they may physically be arranged as part of the same unit or in close proximity. However, as an example, scheduler 120 is not able to schedule execution for core 101 on execution unit 115.

In contrast to cores, a hardware thread typically refers to any logic located on an integrated circuit capable of maintaining an independent architectural state, wherein the independently maintained architectural states share access to execution resources. As can be seen, as certain processing resources are shared and others are dedicated to an architectural state, the line between the nomenclature of a hardware thread and core overlaps. Yet often, a core and a hardware thread are viewed by an operating system as individual logical processors, with each logical processor being capable of executing a thread. Therefore, a processor, such as processor 100, is capable of executing multiple threads, such as thread 160, 165, 170, and 175. Although each core, such as core 101, is illustrated as capable of executing multiple software threads, such as thread 160 and 165, a core is potentially also only capable of executing only a single thread.

In one embodiment, processor 100 includes symmetric cores 101 and 102. Here, core 101 and core 102 are similar cores with similar components and architecture. Alternatively, core 101 and 102 may be asymmetric cores with different components and configurations. Yet, as cores 101 and 102 are depicted as symmetric cores, the functional blocks in core 101 will be discussed, to avoid duplicate discussion in regards to core 102. Note that the functional blocks illustrated are logical functional blocks, which may include logic that is shared between, or overlap boundaries of, other functional blocks. In addition, each of the functional blocks are not required and are potentially interconnected in different configurations. For example, fetch and decode block 140 may include a fetch and/or pre-fetch unit, a decode unit coupled to the fetch unit, and an instruction cache coupled before the fetch unit, after the decode unit, or to both the fetch and decode units.

In one embodiment, processor 100 includes a bus interface unit 150 for communicating with external devices and a higher level cache 145, such as a second-level cache, that is shared between core 101 and 102. In an alternative embodiment, core 101 and 102 each include separate second-level caches.

Fetch, decode, and branch prediction unit 140 is coupled to second level cache 145. In one example, core 101 includes a fetch unit to fetch instructions, a decode unit to decode the fetched instructions, and an instruction cache or trace cache to store fetched instructions, decoded instructions, or a combination of fetched and decoded instructions. In another embodiment, fetch and decode block 140 includes a prefetcher having a branch predictor and/or a branch target buffer. In addition, a read only memory, such as microcode ROM 135, is potentially used to store longer or more complex decoded instructions.

In one example, allocator and renamer block 130 includes an allocator to reserve resources, such as register files to store instruction processing results. However, core 101 is potentially capable of out-of-order execution, where allocator and renamer block 130 also reserves other resources, such as a reorder buffer to track instructions. Block 130 may also include a register renamer to rename program/instruction reference registers to other registers internal to core 101.

Reorder/retirement unit 125 includes components, such as the reorder buffers mentioned above, to support out-of-order execution and later retirement of instructions executed out-of-order. As an example, reorder/retirement unit includes load buffer 126. Load buffer 126 is to store load buffer entries associated with load operations to be scheduled on and executed by execution unit 110. Previously, load buffer entries were stored in program order and de-allocated upon retirement. However, in one embodiment, load buffer 126 is capable of storing senior load buffer entries. Here, in response to a first access to cache 103 or upon retirement of a load operation that is part of a transaction, the associated load buffer entry is stored/marked as a senior load buffer entry. Once the load buffer entry is marked as senior, scheduler 120 schedules a second access or a post-retire access to cache 103 to update tracking information associated with a line loaded from by execution of the load operation.

Similarly, reorder/retirement unit also includes a store buffer capable of storing senior store entries. After retirement of a store operation, scheduler 120, schedules an access to cache 103 to store the modified data and to update tracking information associated with a line of cache 103 that is modified. As a result, the marking of load and store buffer entries as senior entries, the load and store buffers support post-retire accesses to track accesses during a transaction, by retaining the entries beyond retirement. Cache 103 and tracking information are discussed in more detail below.

Scheduler and register files block 120, in one embodiment, includes a scheduler unit to schedule instructions/operation on execution unit 110, as stated above. In fact, instructions/operations are potentially scheduled on execution unit 110 according to their type and execution unit 110's availability. For example, a floating point instruction is scheduled on a port of execution unit 110 that has an available floating point execution unit. Register files associated with execution unit 110 are also included to store information instruction processing results. Exemplary execution units available in execution unit 110 include a floating point execution unit, an integer execution unit, a jump execution unit, a load execution unit, a store execution unit, and other known execution units. In one embodiment, execution unit 110 also include a reservation station and/or address generation units.

In the embodiment illustrated, lower-level cache 103 is utilized as transactional memory. Specifically, lower level cache 103 is a first level cache to store recently used/operated on elements, such as data operands. Cache 103 includes cache lines, such as lines 104, 105, and 106, which may also be referred to as memory locations or blocks within cache 103. In one embodiment, cache 103 is organized as a set associative cache; however, cache 103 may be organized as a fully associative, a set associative, a direct mapped, or other known cache organization.

As illustrated, lines 104, 105, and 106 includes portions and fields, such as portion 104a and field 104b. In one embodiment fields 104b, 105b, and 106b and portions 104a, 105a, and 106a are part of a same memory array making up lines 104, 105, and 106. In another embodiment, fields 104b, 105b, and 106b are part of a separate array to be accessed through separate dedicated ports from portions 104a, 105a, and 106a. However, even when fields 104b, 105b, and 106b are part of a separate array, fields 104b, 105b, and 106b are associated with portions 104a, 105a, and 106a, respectively. As a result, when referring to line 104 of cache 103, line 104 potentially includes portion 104a, 104b, or a combination thereof. For example, when loading from line 104, portion 104a may be loaded from. Additionally, when setting a tracking field to track a load from line 104, field 104b is accessed.

In one embodiment, lines, locations, blocks or words, such as portions 104a, 105a, and 106a of lines 104, 105, and 106 are capable of storing multiple elements. An element refers to any instruction, operand, data operand, variable, or other grouping of logical values that is commonly stored in memory. As an example, cache line 104 stores four elements in portion 104a including four operands. The elements stored in cache line 104a may be in a packed or compressed state, as well as an uncompressed state. Moreover, elements are potentially stored in cache 103 unaligned with boundaries of lines, sets, or ways of cache 103. Memory 103 will be discussed in more detail in reference to the exemplary embodiments below.

Cache 103, as well as other features and devices in processor 100, store and/or operate on logic values. Often, the use of logic levels, logic values, or logical values is also referred to as 1's and 0's, which simply represents binary logic states. For example, a 1 refers to a high logic level and 0 refers to a low logic level. Other representations of values in computer systems have been used, such as decimal and hexadecimal representation of logical values or binary values. For example, take the decimal number 10, which is represented in binary values as 1010 and in hexadecimal as the letter A.

In the embodiment illustrated in FIG. 1, accesses to lines 104, 105, and 106 are tracked to support transactional execution. Accesses include operations, such as reads, writes, stores, loads, evictions, snoops, or other known accesses to memory locations. Access tracking fields, such as fields 104b, 105b, and 106b are utilized to track accesses to their corresponding memory lines. For example, memory line/portion 104a is associated with corresponding tracking field 104b. Here, access tracking field 104b is associated with and corresponds to cache line 104a, as tracking field 104b includes bits that are part of cache line 104. Association may be through physical placement, as illustrated, or other association, such as relating or mapping access tracking field 104b to memory line 104a or 104b in a hardware or software lookup table. In fact, a transaction access field is implemented in hardware, software, firmware or any combination thereof.

As a simplified illustrative example, assume access tracking fields 104b, 105b, and 105b include two transaction bits: a first read tracking bit and a second write tracking bit. In a default state, i.e. a first logical value, the first and second bits in access tracking fields 104b, 105b, and 105b represent that cache lines 104, 105, and 106, respectively, have not been accessed during execution of a transaction, i.e. during a pendency of a transaction.

Assuming a load operation to load from line 104a is encountered in a transaction, a load buffer entry is stored in load buffer 126, which is associated with the load operation. The load operation is scheduled by scheduler 120, and loads from line 104 in cache 103, or other higher-level memory location associated with cache line 104. After loading from line 104, the load operation is retired and marked as a senior load in load buffer 126. In response to being marked as a senior load, scheduler 120 schedules a second or post-retire access to line 104 to update the first read tracking bit from the default state to a second accessed state, such as a second logical value. The second logical value represents that a read/load from cache line 104 occurred during a pendency of the transaction.

Similarly, upon encountering a write/store to cache line 104, a store buffer entry is created in a store buffer. In response to the store buffer entry going senior, an access to cache line 104 is scheduled to update data portion 104a and to set a transaction write bit in field 104b to a second state to represent a write to cache line 104 occurred during execution of the transaction.

Consequently, if the transaction bits in field 104b associated with line 104 are checked, and the transaction bits represent the default state, then cache line 104 has not been accessed during a pendency of the transaction. Inversely, if the first read tracking bit represents the second value, then cache line 104 has been previously accessed during pendency of the transaction. More specifically, a load from line 104a occurred during execution of the transaction, as represented by the first read tracking bit in access field 104b being set. Furthermore, if the first write tracking bit represents the second value, then a write to line 104 occurred during a pendency of the transaction.

Access fields 104b, 105b, and 105b are potentially used to support any type of transactional execution. In one embodiment, where processor 100 is capable of hardware transactional execution, access fields 104b, 105b, and 105b are set by post-retire accesses, as discussed above, to detect conflicts and perform validation. In another embodiment, where hardware transactional memory (HTM), software transactional memory (STM), or a hybrid thereof is utilized for transactional execution, access fields 104b, 105b, and 105b provide a similar post-retire tracking function.

As a first example of how access fields, and specifically transaction tracking bits, are potentially used to aide transactional execution, a co-pending application entitled, "Hardware Acceleration for A Software Transactional Memory System," with Ser. No. 11/349,787 discloses use of access fields/transaction bits to accelerate a STM. As another example, extending/virtualizing transactional memory including storing states of access fields/transaction tracking bits into a second memory are discussed in co-pending application entitled, "Global Overflow Method for Virtualized Transactional Memory," with Ser. No. 11/479,902.

As another simplified illustrative example, assume a plurality of instructions/operations are grouped into a first transaction. One of the operations is a load operation referencing line 105. A load buffer entry is stored referencing the load operation. After accessing cache 103, the load buffer entry is marked as a senior load. Line 105 is accessed again in response to the load buffer entry being marked as a senior load, to update access tracking field 105b to represent that a load from line 105 occurred during a pendency of the transaction. In one embodiment, subsequent loads within the same transaction to line 105 are tracked by similar post-retire accesses. However, since an access field is set after a first access to a corresponding line, a filtering mechanism is potentially used to schedule a post-retire access on the first access to the line, and not on subsequent similar accesses. Filtering is discussed in more detail below in reference to FIG. 5 and FIG. 8.

Now assume a second transaction includes a write a location associated with line 105, which occurs before the first transaction is committed. As a result, a conflict is detected, since field 105b represents that line 105 has been loaded from, and now a second transaction is attempting to write to the location. Consequently, either the first or second transaction may be aborted, and the other transaction is completed.

In one embodiment, upon the second transaction causing a conflict in regards to line 105 with corresponding field 105b indicating a previous access by the first pending transaction, an interrupt is generated. That interrupt is handled by a default handler and/or an abort handler that initiates an abort of either the first or second transaction, as a conflict occurred between two pending transactions.

Upon an abort or commitment of the transaction, the transaction bits that were set during execution of the transaction are cleared to ensure the states of the transaction bits are reset to the default state for later tracking of accesses during subsequent transactions. In another embodiment, access tracking fields may also store a resource ID, such as a core ID or thread ID, as well as a transaction ID.

In addition to tracking, conflict checking and validation of a transaction may be done utilizing access fields 104b, 105b, and 105b. First, if an invalid access, which would cause the transaction to abort, is tracked, then at the time of the invalid access the transaction is aborted and potentially restarted. Alternatively, validation of the lines/locations accessed during execution of the transaction is done at the end of the transaction before commitment. At that time, the transaction is committed, if the validation was successful, or aborted if the validation was not successful. In either of the scenarios, access tracking fields 104b, 105b, and 105b are useful, as they identify which lines have been accessed during execution of a transaction. As a result, updating of access tracking fields 104b, 105b, and 105b utilizing a post-retire scheme may be used in any known or otherwise available transactional execution scheme.

As referred to above in reference to FIG. 1, lower level cache 103 is utilized as transactional memory. However, transactional memory is not so limited. In fact, higher level cache 145 is potentially used as transactional memory. Here, accesses to lines of cache 145 are tracked utilizing a post-retire mechanism. As mentioned, an identifier, such as a thread ID or transaction ID is potentially used in a higher level memory, such as cache 145, to track which transaction, thread, or resource performed the access being tracked in cache 145.

As yet another example of potential transactional memory, a plurality of registers associated with a processing element or resource as execution space or scratch pad to store variables, instructions, or data are used as transactional memory. In this example, memory locations 104, 105, and 106 are a grouping of registers including registers 104, 105, and 106. Other examples of transactional memory include a cache, a plurality of registers, a register file, a static random access memory (SRAM), a plurality of latches, or other storage elements. Note that processor 100 or any processing resources on processor 100 may be addressing a system memory location, a virtual memory address, a physical address, or other address when reading from or writing to a memory location.

Although, transactional memory has been specifically discussed in reference to an exemplary multi-core architecture shown in FIG. 1, utilization of a post-retire transaction access tracking scheme may be implemented in any processing system for executing instructions/operating on data. As an example, an embedded processor capable of executing multiple transactions in parallel potentially implements a post-retire tentative access tracking scheme.

Figure 2A:
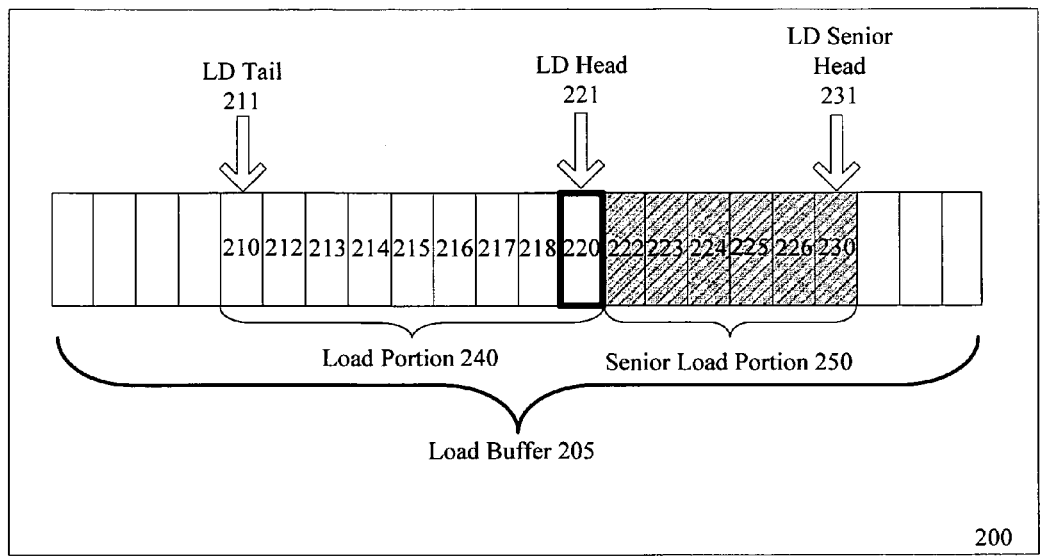
FIG. 2a illustrates an embodiment of a load buffer capable of storing senior load buffer entries.

Turning to FIG. 2a, an embodiment of a load buffer in a processing element is illustrated. In one embodiment, processing element 200 is a processor capable of executing multiple threads in parallel including multiple transactions in parallel. Although, processing element 200 may include any element for executing instructions and/or operating on data, such as an embedded processor, a network processor, a microprocessor, a host processor, a co-processor, a cell processor, a vector processor, a mobile processor, a desktop processor, a server processor, or any other known or otherwise available processor.

Load buffer 205 is for storing load buffer entries associated with load instruction/operations. Load buffer 205 may be any buffer or queue for storing references to load instructions or operands, such as a re-order buffer. When a load operation is encountered, a load buffer entry is created/stored in load buffer 205. In one embodiment, load buffer 205 stores load buffer entries in program order, i.e. an order the instructions or operations are ordered in the program code. Here, youngest load buffer entry 210, i.e. the most recently stored load buffer entry, is referenced by load tail pointer 211. In contrast, oldest load buffer entry 220, which is not a senior load, is referenced by load head pointer 221.

In an in-order execution processing element, load operations are executed in the program order stored in the buffer. As a result, the oldest buffer entries are executed first, and load head pointer 221 is re-directed to the next oldest entry, such as entry 218. In contrast, in an out-of-order machine, operations are executed in any order, as scheduled. However, entries are typically removed, i.e. de-allocated from the load buffer, in program order. As a result, load head pointer 221 and load tail pointer 211 operate in similar manner between the two types of execution.

Yet, upon completing execution of the oldest operation that is not a senior load, as referenced by entry 220; here, load buffer 205 is capable of storing senior load buffer entries, such as entries 222-230 in senior load portion 250. Consequently, load buffer 205 potentially stores load operations to be scheduled and executed in portion 240, as bounded by load tail entry 210 and load head entry 220, and senior load entries in portion 250 to be scheduled for post-retire access to transactional memory, as bounded by load head entry 220 and senior load head entry 230, which is referenced by senior load head pointer 231.

As an example, assume that load portion 240, which includes load entries 210-220 have been filled with load entries referencing load operations to be executed. In addition, assume that load buffer 205 also includes senior load buffer entries 222-230 in portion 250, which store references to senior loads. Upon completing execution of a load operation associated with or referenced by entry 220, entry 220 is marked as a senior load entry instead of being de-allocated. Here, load head pointer 221 is moved to point to next oldest entry 218, which becomes load head entry 218.

Furthermore, a scheduler, which is not illustrated in FIG. 2a, schedules post-retire accesses to a transactional memory in response to entries being marked as senior load buffer entries. After entry 220 is marked as a senior load buffer entry, the scheduler schedules an access to a line of transactional memory referenced by senior load buffer entry 220. In one embodiment, the post-retire access based on entry 220 is scheduled when entry 220 is pointed to by load senior head pointer 231. In another embodiment, the post-retire access is scheduled anytime and de-allocated in program order from the buffer when it is pointed to by senior load head pointer 231.

In addition, between the post-retire accesses, loads, fills, and other accesses a priority scheme may be used. As an example, a priority scheme prioritizes loads as the highest priority, senior loads (i.e. post-retire accesses) as the second highest priority, and fills as the next highest priority. Any priority or otherwise known method of scheduling accesses is potentially used.

In one embodiment, a load access tracking field is set upon the post-retire access to the line previously loaded from by a load operation referenced by entry 220, when entry 220 was present in load portion 240. The tracking field is utilized to determine if loads have accessed a line that corresponds to the tracking field during a pendency of a transaction. Access tracking, post-retire scheduling, and post-retire accesses are discussed in more detail below.

FIG. 2a illustrates one example of a load buffer capable of storing senior loads. However, in other implementations, load buffer 205 includes a field or bit to mark the entry as senior. Furthermore, any known method or otherwise available method of marking stores or loads as senior may be used. In addition, entries are not required to be stored in program order. Marking of an entry as a senior load is discussed in more detail in reference to FIGS. 3a-3b.

Moreover, processing element 200 may also include a store buffer, not depicted, to store write entries associated with write/store operations. Similar to operation of load buffer 205, a store buffer includes store buffer entries and senior store buffer entries. In one embodiment, a scheduler schedules post-retire writes to both update the memory line and set a write tracking value associated with the memory line, which is referenced by a store operation associated with a senior store buffer entry. Alternatively, a store buffer potentially operates in a similar manner to the load buffer, in that the scheduler schedules a write before the store buffer entry goes senior and schedules a post-retire access in response to the store buffer entry being marked senior.

Figure 2B:
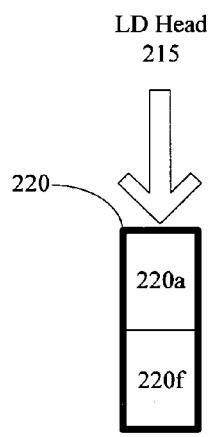

Referring down to FIG. 2b, an embodiment of a buffer entry is illustrated. Here, load buffer entry 220 is to store reference 220a to a load operation. In one embodiment, when load buffer entry 220 is an entry in load portion 240, reference 220a includes an address, such as a virtual memory address, a physical address, or a value based on a virtual or physical address. Later, when entry 220 is marked as a senior load, reference 220a includes a set and way that references a load operation or a line of memory associated with the load operation. A reference to a load operation may include an identifier or a copy of the load operation stored in field 220a. However, reference 220a is not so limited, as it may include any known or otherwise available method of referencing an operation or a line of memory. Store buffer entries in a store buffer include references similar to reference 220a.

Note that a reference to a line of a transactional memory, such as a cache memory, may be a direct or indirect reference. As stated above, a direct reference within cache includes a tag value, a set and way, a specific cache line address, or other cache indexed address. Another reference to a transactional memory includes a virtual address or physical address relating to a system memory location that is associated with a location in a cache. For example, a virtual address is capable of being translated into a physical address that is associated with a system memory location. A cache is potentially indexed by all or a portion of the virtual address, the physical address, or a mathematical manipulation, such as a hash value, of a virtual or physical address. Therefore, an operation referencing a virtual address translated into a physical address to be cached by a cache memory is a reference to the line of the cache memory that is capable of caching the system memory location.

In addition, filter field 220f is potentially included in entry 220. Filter field 220f is to store a state of a load tracking field associated with a line of a memory referenced by entry 220 or a load operation referenced by entry 220. Upon retirement of a load operation associated with entry 220, entry 220 is marked as a senior load entry. When entry 220 becomes the senior load entry being referenced by load senior head pointer 231, in one embodiment, a scheduler schedules a post-retire access to the line of memory to set the tracking field. Yet, if a memory line is accessed multiple times within a transaction, subsequent load operations setting a tracking value that has been already set potentially wastes execution cycles.

For example, assume that senior entry 230 is associated with a load operation in a first transaction referencing a first line of a cache. A scheduler schedules a post-retire access to the first line of the cache in response to entry 230 being marked senior. A first load tracking value associated with the first line of the memory is set to indicate that the first line of memory has been loaded from during a pendency of the first transaction. Subsequently, assuming load entry 220 is associated with a second load operation that is part of the first transaction and also references the first memory line, another post-retire access is scheduled to set the first load tracking value.

However, the first load tracking value has already been set by the first post-retire access, therefore, in another embodiment, when the load operation associated with entry 220 is first executed, the first tracking value is read from the cache and stored in filter field 220f. If the value stored in the filter field represents that the first tracking value has already been set, then a scheduler does not schedule the post-retire access. In one embodiment, upon marking a load entry, such as entry 220, as a senior load entry, where a filter field represents no post-retire access is to be scheduled, the entry is immediately de-allocated. Alternatively, the entry is stored as a senior entry and is de-allocated in program order, when it is pointed to by senior load head pointer 231.

Figure 3A:
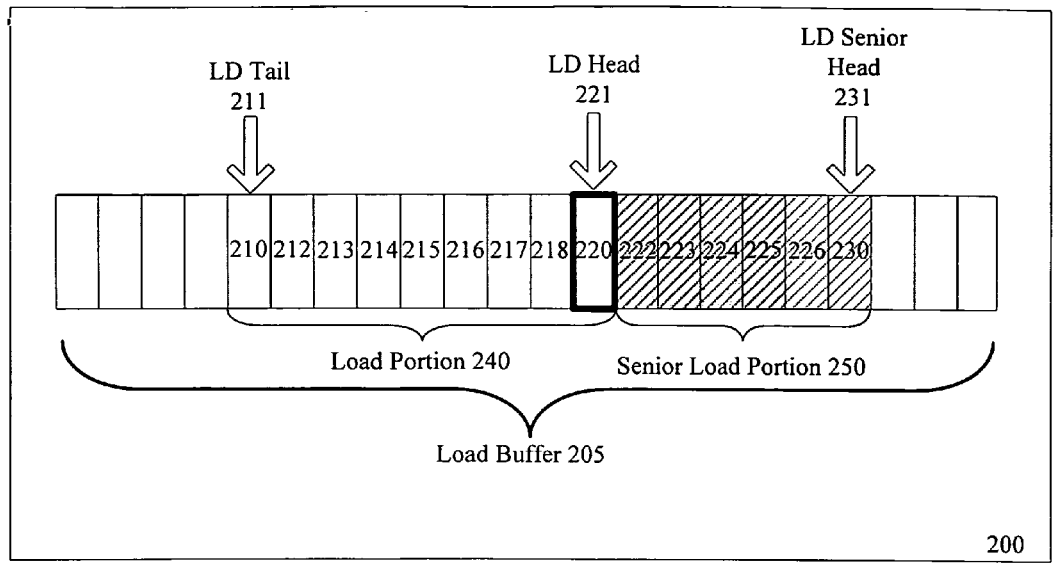
FIG. 3a illustrates another embodiment of a load buffer capable of storing senior load buffer entries.
Figure 3B:
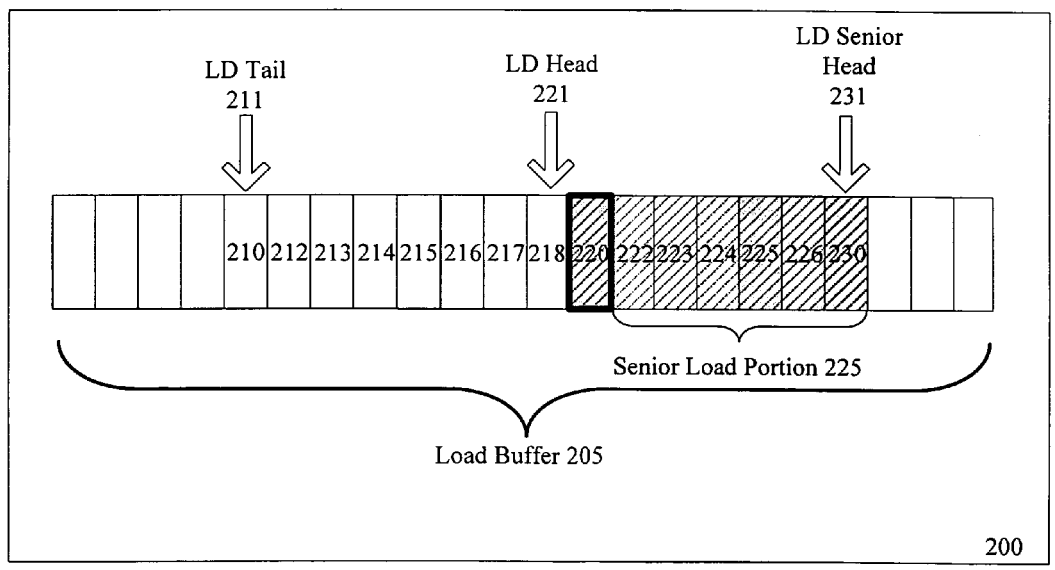
FIG. 3b illustrates an embodiment of FIG. 3a after a load buffer entry is marked as a senior load buffer entry.

Turning to FIGS. 3a and 3b, an illustrative embodiment of marking an entry as a senior entry is illustrated. Here, load entry 220 is the oldest load entry in load buffer 205, which is not a senior load entry. Upon or in response to retirement of a load operation associated with entry 220, entry 220 is marked as a senior load entry. In other words, after a first access to the memory referenced by the load operation, the load operation is marked as a senior load entry.

In one embodiment, marking entry 220 as a senior load entry includes moving head load pointer 221 to the next non-senior load buffer entry, such as entry 218, as illustrated in FIG. 3*b*. In other words, load head pointer 221 points to a current entry or oldest entry that is not a senior entry, and load head pointer 221 is pointed, redirected, or targeted to next oldest entry 218. Now, in contrast to FIG. 3*a*, entry 220 is between or bounded by head load pointer 221 and senior load head pointer 231, i.e. portion 250 that includes senior load entries, in FIG. 3*b*. Note that if all the post-retire accesses are scheduled and performed for entries 220-230, then load senior head pointer 231 may point to an empty buffer entry or the same entry as load head pointer 221.

Marking a buffer entry as a senior buffer entry is not limited to the embodiment discussed above. In fact, a field in each entry may be utilized. When the senior field represents a default value, the entry is not senior and is to be scheduled for a first access. After the first access, the field is set to a second value to mark the entry as a senior entry. A store buffer may also mark buffer entries as senior in any manner. For example, in the embodiment where a post-retire access is scheduled to both write to a line of memory referenced by a store operation and set an access tracking field corresponding to the line of memory, a store buffer entry is marked as senior after execution or upon retirement. As above, pointers may be moved, entries may be moved, or entries may be marked upon the retirement or after execution to mark the store buffer entry as senior.

Figure 4:
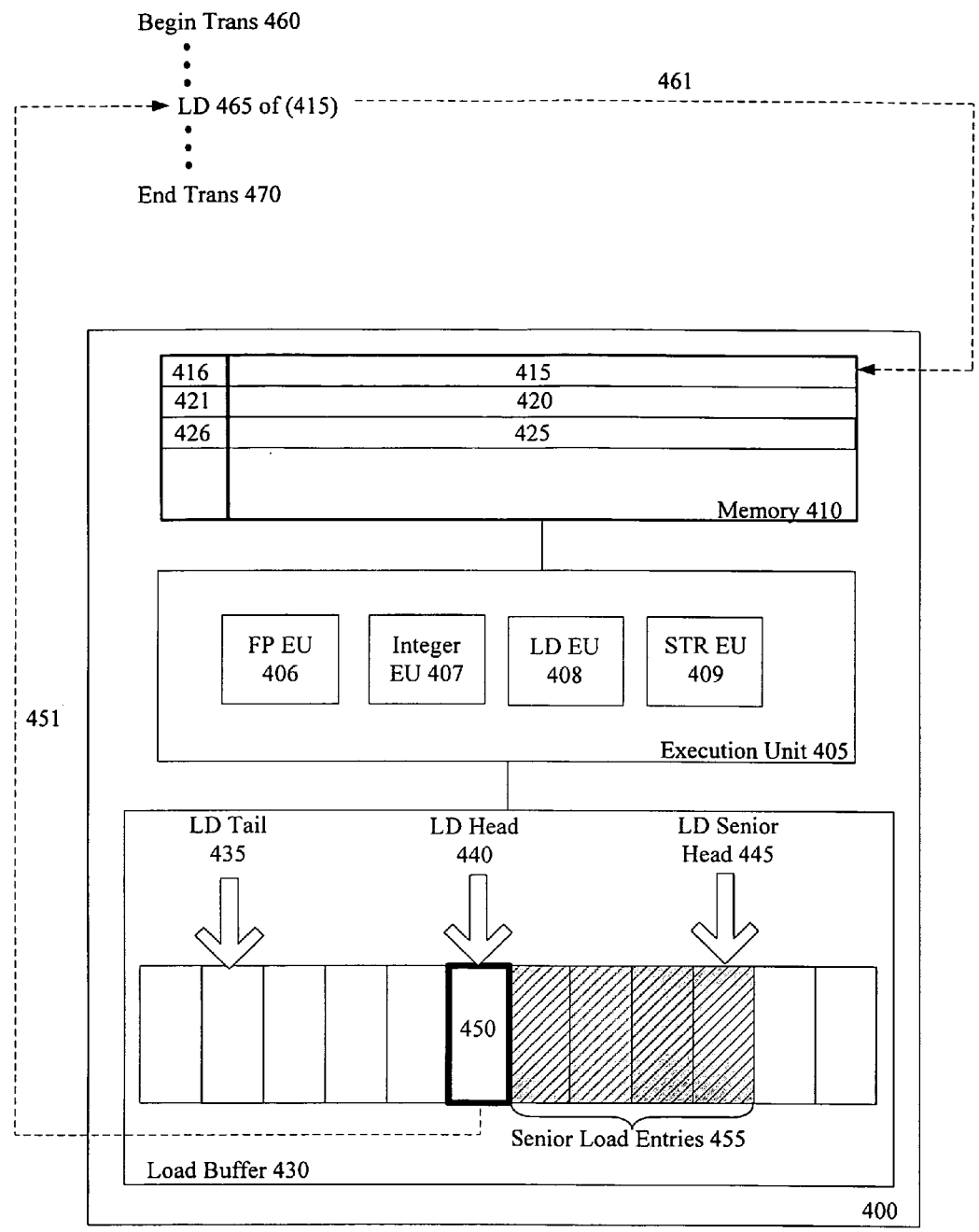
FIG. 4 illustrates an embodiment of a processing element capable of performing post-retire load tracking.

Referring next to FIG. 4 an embodiment of a processor capable of post-retire load tracking is illustrated. Processor 400 includes any processing element, as stated above. In one embodiment, processor 400 is a multi-core processor. Processor 400 includes execution unit 405 to execute instruction and/or operate on data. In one embodiment, execution unit 405 includes multiple different execution units, such as floating point execution unit 406 to perform floating point operations, integer execution unit 407 to perform integer operations, load execution unit 408 to perform loads/reads, and store execution unit 409 to perform stores/writes. Any combination of the aforementioned execution units and otherwise available execution units are potentially included in execution unit 405.

Transactional memory 410 is coupled to execution unit 405. In one embodiment, memory 410 is a cache memory in processor 400. As an example, cache memory 410 is organized as a set associative cache, which includes a plurality of lines, such as lines 415, 420, and 425. Access tracking fields 416, 421, and 426 correspond to lines 415, 420, and 425, respectively. In one embodiment, access tracking fields 416, 421, and 426 are in a separate array from lines 415, 420, and 425. As a result, access tracking fields 416, 421, and 426 are accessible through separate ports from lines of memory 410. Therefore, upon post-retire accesses, ports utilized to access lines of memory 410 are not tied up, as post-retire access are capable of setting access tracking fields through separate ports.

Load buffer 430 is to store load buffer entries associated with load operations. Load operations may be part of a transaction or part of a normal execution flow. As illustrated, a first transaction is demarcated by begin transaction instruction 460 and end transaction instruction 470. Within the first transaction any number of instructions are present, including load operation 465, which references line 415. In one embodiment, reference 461 to line 415 includes an address of cache line 415, such as a tag value, a virtual address, or a physical address. Alternatively, load 465 references a system memory location in a page of memory mapped to a set of lines in memory 410 including line 415. Here, line 415 is eventually selected by cache control logic to cache the system memory location referenced by load 465.

As an example, load operation 465 references a virtual memory address, which is capable of being translated into a physical memory location in a system memory. An element stored in the physical memory location is cached in line 415, which is part of a set of lines that a page of memory including the physical memory location is associated with. Therefore, upon executing the load, line 415 may be directly loaded from, if the element is cached in line 415. Alternatively, if memory 410 is missed, then the element is loaded from the system memory location into line 415, and then loaded from by execution unit 405.

Upon encountering load operation 465, load buffer entry 450 is stored in load buffer 430. Encountering load operation 465 may include decoding an instruction which includes a load operation, retrieving a decoded operation from an instruction cache, or otherwise available method of discovering a load operation.

When load buffer entry 450 is the most recent load operation stored in load buffer 430, i.e. the youngest load operation in program order, it is referenced by load tail pointer 435. As illustrated, load entry 450 is the oldest load buffer entry that is not a senior load entry, which is referenced by load head pointer 440. Load entry 450 references load operation 465, as illustrated by logical reference 451. References to a load operation include an operation identifier, a representation of an address referenced by a load, such as the address to be loaded from, or any other reference to an operation.

A scheduler, not illustrated, schedules a first access to line 415 in memory 410 based on entry 450. Line 415 is then loaded from by execution unit 405, as scheduled. Upon execution, completion, or retirement, entry 450 is marked as a senior load entry. Here, load head pointer 440 is pointed to the next oldest entry that is not a senior entry, demarcating entry 450 between load head pointer 440 and load senior head pointer 445. In response to being marked a senior load entry, the scheduler, schedules a second post-retire access to memory 410 to update or set access field 416. Setting access field 416 represents that a load from line 415 occurred during a pendency of the first transaction. Consequently, if another transaction attempts to write to line 415 or the system memory location cached by line 415, while the first transaction is still pending, a conflict is detected and may be handled appropriately.

Moreover, assuming the first transaction also included a write operation to line 420, not illustrated, which is marked dirty, memory 410, in one example, writes-back the contents of line 420 to a higher-level memory. For example, assume that line 420 was modified before begin transaction 460 was encountered, resulting in line 420 being in a modified state in a Modified Exclusive Shared Invalid (MESI) cache coherency protocol. When a write to line 420 is to be executed during a transaction, line 420 is written back to a higher-level memory, such as a second level cache if memory 410 is a first-level cache. This write-back preserves the modified value of line 415 in case the first transaction is aborted.

Figure 5:
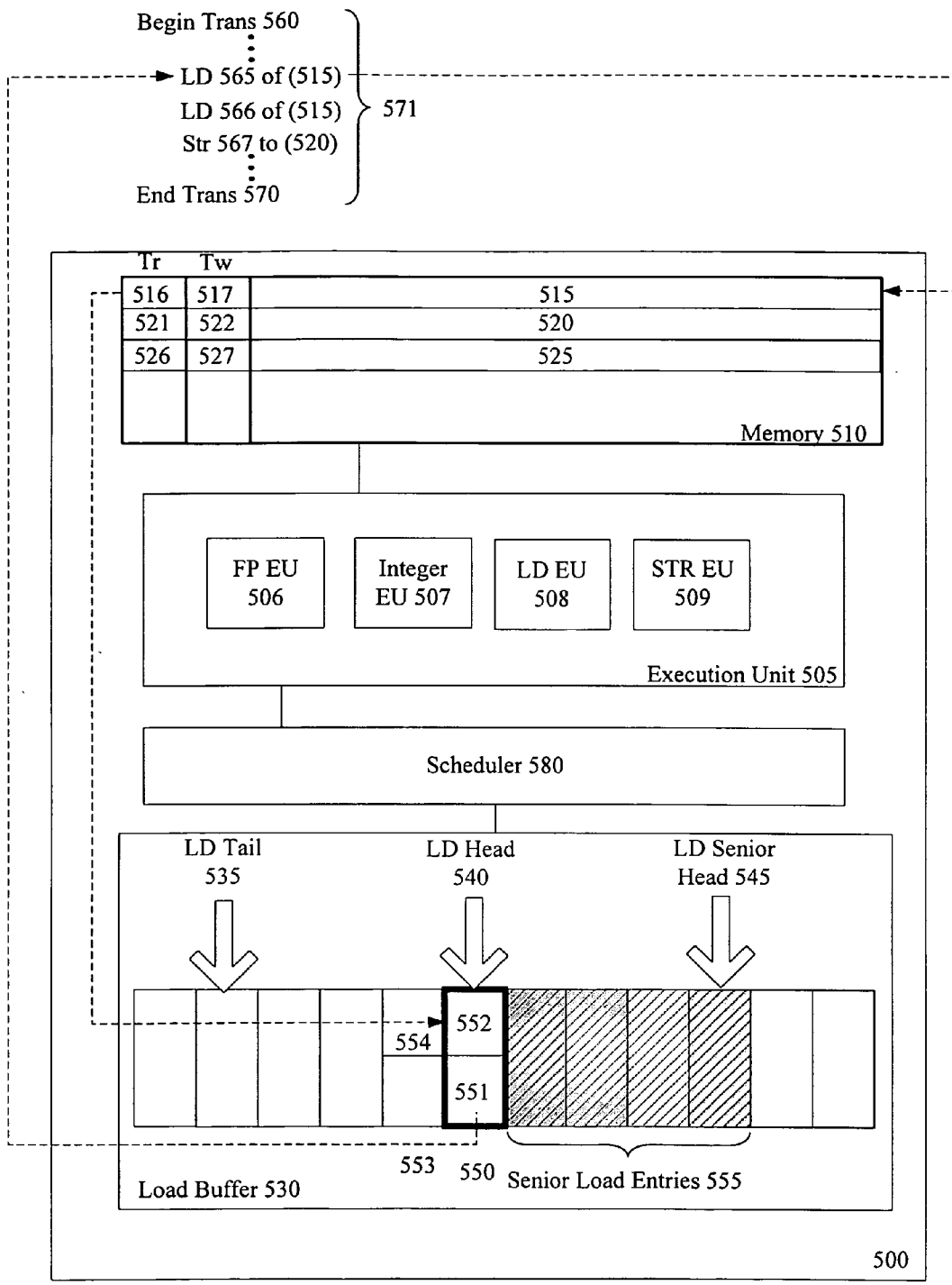
FIG. 5 illustrates an embodiment of a processing element capable of performing filtered post-retire load tracking.

In FIG. 5 another embodiment of a processor capable of performing post-retire access tracking is illustrated. Similar to FIG. 4, processor 500 includes execution unit 505 with execution units 506, 507, 508, and 509. Memory 510 includes lines 515, 520, and 525. However, read tracking bits 516, 521, and 526, as well as write tracking bits 517, 522, and 527 correspond to lines 515, 520, and 525, respectively. As stated above, tracking bits may be part of a cache line, utilize the same ports as the rest of the cache line, or correspond to ports that are separate from the rest of a cache line.

When read tracking bits 516, 521, and 526 store a first default logical state, they represent that lines 515, 520, and 525 have not been loaded from during execution of a pending transaction. However, if read tracking bits 516, 521, and 526 are set to a second state, they represent that lines 515, 520, and 525 have been loaded from during a pending transaction. Similarly, write tracking bits 517, 522, and 527 represent that lines 515, 520, and 525 have been written to during a pending transaction if they are set, and that lines 515, 520, and 525 have not been written to during a pending transaction, if they are in a default state.

Scheduler 580 is coupled to execution unit 505 to schedule operations on execution unit 505. For example, scheduler 580 schedules load operations referenced by load entries in load buffer 530 to load lines from memory 510. Here, load entry 550 references load 565, which references line 515 of memory 510. Scheduler 580 schedules a first access to line 515. In one embodiment, the first access includes both a load from line 515 and a read of transaction read bit 516. A state of transaction read bit 516 is determined/read, which is in a default state since in this example load 565 is the first load from line 515 during execution of transaction 571. The default state is stored in filter field 552. In addition, after line 515 is loaded from, entry 550 is marked as a senior load entry. Load head pointer 540 is moved to entry 553, and entry 550 becomes part of senior load portion 555.

In response to being marked a senior load entry, a post-retire or second access to line 515 is scheduled by scheduler 580 to update transaction read bit 516 to a second state representing line 515 has been loaded from during execution of transaction 571, since filter field 552 represents the default state, i.e. there had been no load from line 515 prior to load operation 565 during execution of transaction 571. Alternatively, if a previous load operation had accessed line 515 before load operation 565 and set transaction read bit 516 to the second state, then upon reading transaction read bit 516 the second state would have been stored in filter field 552. In that case, scheduler 580 potentially does not schedule a post-retire access, as there is no need to set transaction read bit 516 to the second state, since it is already set to the second state.

To provide a simplified illustration, the example above is continued. Assume load operation 565 has been performed and a post-retire access has also been performed in response to load entry 550 being marked as a senior load entry. As load operation 566 is encountered, load entry 553 is stored to reference load operation 566, which references line 515 as well. An access to line 515 is scheduled by scheduler 580 based on load entry 553. Line 515 is loaded from and transaction read bit 516 is also read. As the previous post-retire access set transaction read bit 516 to the second logical state, the second logical state is stored in filter field 554. Entry 553 is then marked as a senior load entry.

Here, scheduler 580 does not schedule a post-retire access to field 516 as filter field 554, which is to store the state of transaction read bit 516, represents the second logical state, i.e. a previous load, load 565, already occurred during a pendency of transaction 571. Therefore, either at that time or when entry 553 is referenced by load senior head pointer 545, entry 553 is de-allocated without a second post-retire access to line 515.

In another embodiment, processor 500 also includes a store buffer to hold store buffer entries associated with store operations. Here, when store operation 567 is encountered, an associated store buffer entry is created/stored. Scheduler 580 or another scheduler schedulers the store operation based on the store buffer entry. Upon execution of the store operation, the store buffer entry is marked as a senior store buffer entry. Execution of a store operation potentially includes writing the value to be stored to a register file, and awaiting a subsequent scheduled access to memory 510 to write to line 520. Scheduler 580 then schedules a store to line 520 and an update to transaction write bit 522. Similar in operation to load buffer 530, a default value in bit 522 represents that line 520 has not been written to during a pendency of transaction 571, and a second value in bit 522 represents that line 520 has been written to during execution of transaction 571.

In an alternate embodiment, the store buffer operates more like load buffer 530, in that it schedules a first access to write to line 520 and a subsequent post-retire access to set transaction write bit 521. However, note that an access to a memory line, such as line 515, may include a single access that accesses just portion 515 or portion 515 and transaction bits 516 and 517. Alternatively an access includes a first operation, such as a load or store, scheduled on a first port, and a read from transaction bits 516 and/or 517 on a separate port.

Figure 6:
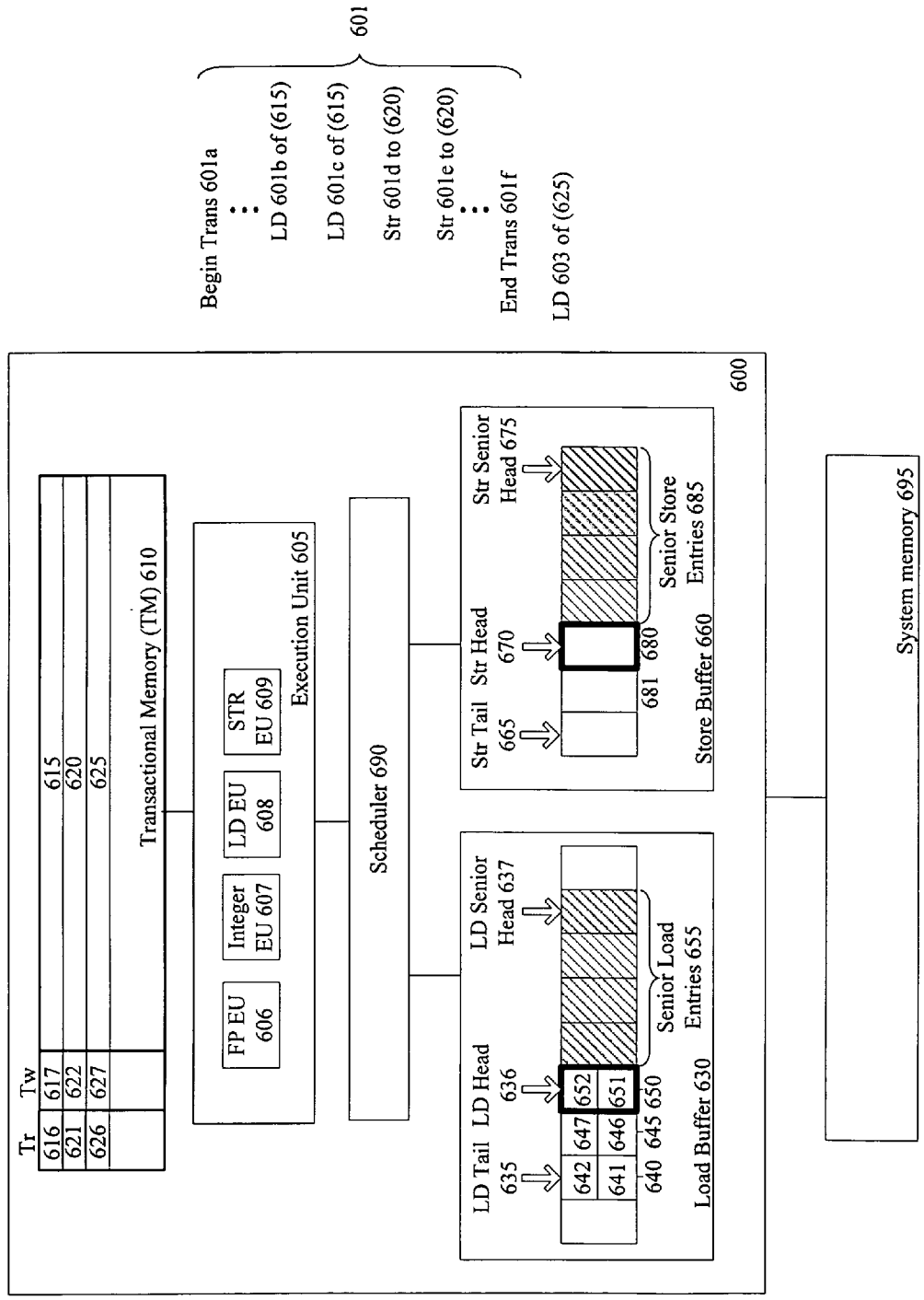
FIG. 6 illustrates an embodiment of a system capable of performing filtered post-retire store and load tracking.

Turning to FIG. 6, an embodiment of a computer system capable of performing post-retire access tracking is illustrated. Processor 600 is a processor in a single processor, co-processor, cell processor, multiprocessor, or other electronic system including a processor. Processor 600 as illustrated is coupled to system memory 695. System memory 695 is to store elements to be cached by transactional memory 610. In one embodiment, system memory 695 is dedicated to processor 600. In another embodiment, system memory 695 is accessible and addressable by other processors and devices in the system. Common examples of system memory include, random access memory (RAM), double data rate (DDR) RAM, synchronous RAM (SRAM), or other types of memory such as non-volatile memory, i.e. NOR and NAND flash memory. Even though system memory 695 is illustrated directly coupled to processor 600, often an intervening device, such as a memory controller hub (MCH), is coupled between processor 600 and system memory 695. However, an MCH may also be present on processor 600 or not present in the system.

As referred to above, often processor 600, or an operation to be executed on processor 600, references a location in transactional memory (TM) 610 through an address which is associated with a location in system memory 695. For example, a virtual address is referenced initially by processor 600 in regards to a load operation. A portion of the virtual address or a portion of a physical address translated by a page table structure from the virtual address, typically indexes a cache. As a result, in a direct mapped or set associative cache, multiple system memory locations are usually mapped to a line of TM 610 or a set of lines in TM 610. Therefore, referencing line 615 includes referencing a system memory location to be cached in line 615 by a virtual memory address, a physical address, a tag value, an index value, a portion of an address, or a hash value based off any of the aforementioned values/addresses.

As an example, operation of processor 600 is illustrated through simplified transaction 601 demarcated by begin transaction instruction 601*a* and end transaction instruction 601*f*. Load buffer entry 650 is associated with load operation 601*b* in association field 651. Association, as stated above, may include a reference to the load operation, an identifier, a reference to line 615, or other available method of referencing a load operation. Load operation 601*b* references line 615 of transactional memory 610. Load buffer entry 645 references load operation 601*c* in reference field 647, while load 601*c* references line 615. In addition, load buffer entry 640 references load operation 603, which is not part of transaction 601, in reference field 641.

Scheduler 690 schedules a load from line 615 based on entry 650. Line 615 is loaded from and a state of transaction read bit 616, which corresponds to line 615, is stored in filter field 652. Upon retirement, load buffer entry 650 is marked as a senior load, i.e. load head pointer 636 is moved to load buffer entry 645. In response to load buffer entry 650 being marked as a senior load entry, a post-retire access to transactional memory 610 is scheduled by scheduler 690. The post-retire access sets transaction read bit 616 to a second logical state to represent line 615 has been loaded from during execution of transaction 601.

Scheduler 690 schedules a load from line 615 based on entry 645 or load operation 601*c*, which is referenced by entry 645. Line 615 is loaded from and the state of transaction read bit 616, which now represents the second logical value, is stored in filter field 647. Upon completion of load operation 601*c*, entry 645 is marked as a senior load. However, since filter field 647 represents the second logical value, no post-retire access is scheduled to set transaction bit 616, since it is already set, as represented by the second logical value being stored in filter field 647.

Similar in operation, store buffer 660 includes store buffer entries that correspond to store operations. Here, store buffer entry 680 references store operation 601*d* and store buffer entry 681 references store operation 601*e*. Upon retirement of store operation 601*d*, store buffer entry 680 is marked as a senior store buffer entry. Here, store head pointer 670 is pointed to next oldest entry 681 to mark entry 680 as a senior entry. A post-retire access to memory 610 is scheduled by scheduler 690 to write to line 620 and to set transaction write bit 622 to represent a write to line 620 occurred during execution of transaction 601. Analogously, after retirement of store operation 601*e*, a post-retire access to line 620 is scheduled to write to line 620. In one embodiment, entry 681 includes a filter field to store transaction write bit 622, and an update to write bit 622 is not scheduled if the filter field represents that write bit 622 has already been set. Alternatively, bit 622 is set during the post-retire access, as the write to line 620 occurs after retirement, instead of pre-retirement, as described in reference to load buffer 630.

Next, assume that load operation 603 stores transaction read bit 616 in filter field 642 before execution, retirement, or de-allocation of end transaction instruction 601*f*. Normally in response to marking load entry 640 as a senior entry, filter field 642 is checked to see if a post-retire access is to be scheduled. Yet, load operation 603 is part of normal execution or another transaction, not transaction 601. Therefore, upon executing, retiring, or de-allocating end transaction instruction 601*f* or an operation that is part of end transaction instruction 601*f*, filter field 642 of entry 640, which is younger then end transaction 601*f*, is cleared to ensure proper post-retire access tracking for later transactions. In one embodiment, transaction read bit 616 and transaction write bit 622 are cleared back to a default state upon aborting or committing transaction 601 to reset tracking values for subsequent transaction access tracking.

Figure 7:
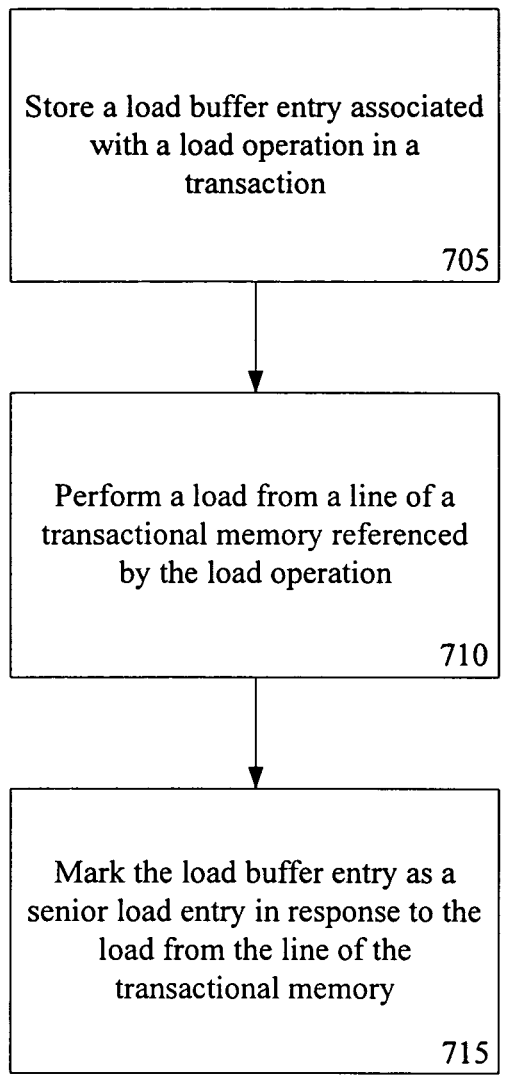
FIG. 7 illustrates an embodiment of a flow diagram for marking a load buffer entry as a senior load buffer entry.

Referring next to FIG. 7 an embodiment of a flow diagram for a method of marking a load buffer entry as a senior load buffer entry is illustrated. In flow 705, a load buffer entry associated with a load operation is stored/created. A decoded instruction potentially includes multiple micro-operations, such as load operations. Therefore, upon encountering a load operation or micro-operation in a program flow, a load buffer entry is created to reference the load operation. A reference to the load operation includes an identifier, such as an address of the instruction in system memory or a trace cache. The load operation code itself may also be stored in the load buffer entry.

In flow 710, a load from a line of a transactional memory referenced by the load operation is performed. The load operation may reference a virtual or physical memory address of a physical location in memory. The virtual address is capable of being translated through a system of page tables to a physical address of the physical memory location. The transactional memory, which in one embodiment is a cache memory, is to cache the physical location in system memory. In a direct mapped cache organization, each system memory location has a specific single line of a cache to be stored in. Here, any address or value capable of referencing a physical memory location is also said to reference a cache line of the four cache lines that control logic eventually selects to cache the system memory location.

Alternatively, if the cache is organized as a set associative cache, then each memory location is potentially stored in any number of lines in a set. For example, a system memory location within a page is mapped to a line in each way of a four way cache to form a set of four lines. Consequently, there are four lines of a cache that a physical location may be stored in. However, any portion of an address, a tag value, or a hash value that a load operation utilizes to determine a system memory location references the cache line that is eventually selected by cache control logic to cache the physical system memory location.

Therefore, performing the load from a line of a transactional memory includes directly loading a line of the cache, if it includes a valid copy of the system memory location to be loaded, i.e. a cache hit occurs. However, if a valid copy is not present, then the system memory location is loaded into the cache and then loaded from the cache. In addition, either as part of the load or part of a separate read operation, a transaction access field may also be read. In one embodiment, the access field is part of the line being loaded and the part of the line including the access field is separately stored in a filter field in the load buffer entry. In another embodiment, a load from the line of cache occurs and a separate load/read is performed through a separate port to read the transaction access fields, which are present in a separate array to provide distinct ports.

Next, in flow 715, a load buffer entry is marked as a senior load entry in response to the load from the line of the transactional memory. In one embodiment, marking the load buffer entry as a senior entry includes moving a head load pointer, which is currently pointing to the load buffer entry, to a next oldest load buffer entry that is not a senior load entry. As discussed above, pointing the head load pointer to the next oldest entry bounds the load buffer entry between the load head pointer and a senior head pointer, which demarcates the entry as a senior entry. By construct, a scheduler is able to determine that entries after the load head pointer are senior entries that are potentially to be scheduled for a post-retire access. However, marking a buffer entry as a senior entry is not so limited. In fact, each entry may include a field to store a bit, which when set, represents the entry is a senior buffer entry. Any known or otherwise available method of marking a load buffer entry, store buffer entry, or other buffer entry as a senior entry may be used to mark a buffer entry as senior.

Figure 8:
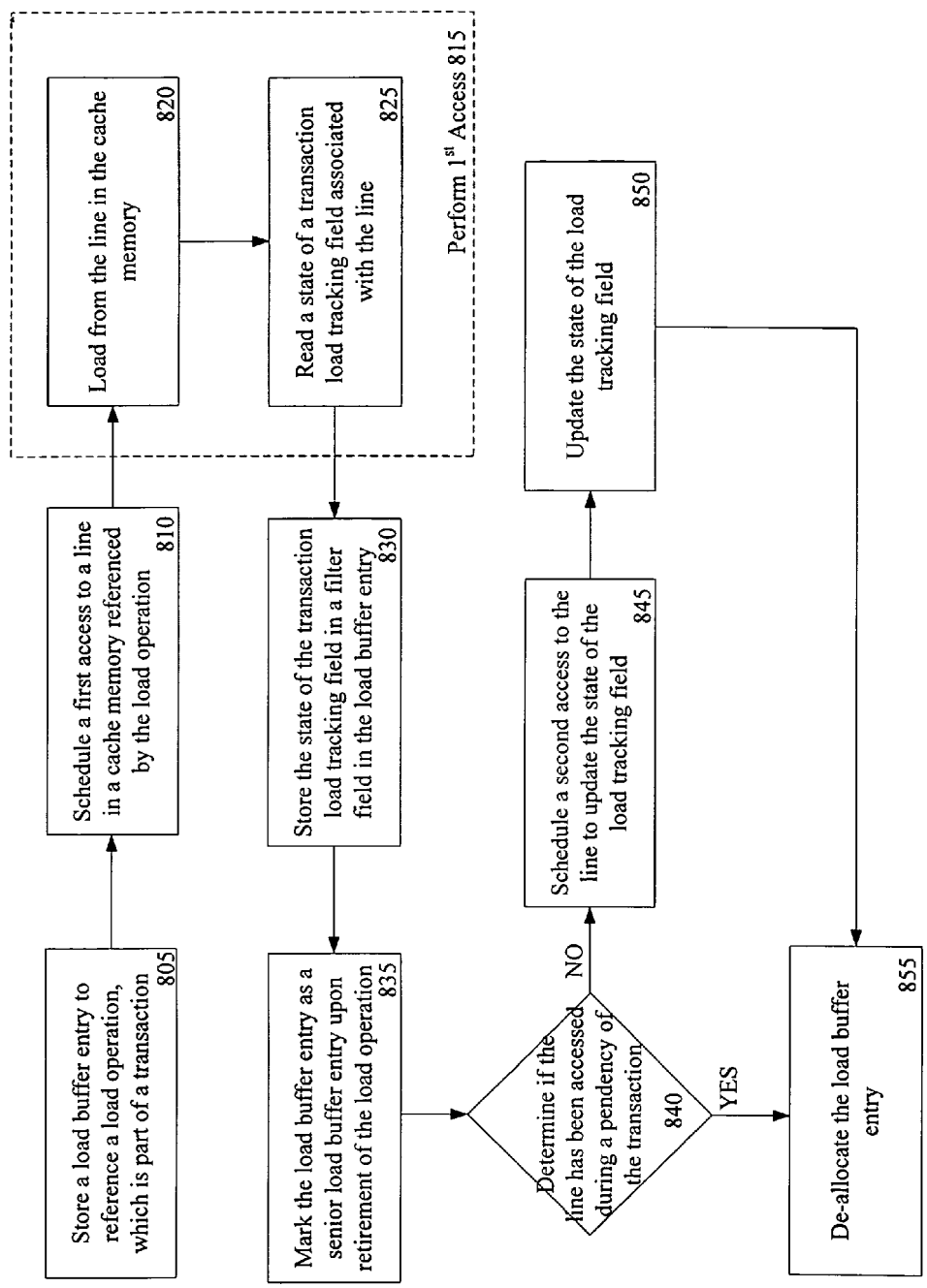
FIG. 8 illustrates an embodiment of a flow diagram for performing a filtered post-retire access to track a load operation in a transaction.

In reference to FIG. 8, an embodiment of a method for performing filtered post-retire access tracking is illustrated. In flow 805, a load buffer entry to reference a load operation, which is part of a transaction, is stored. As above the reference may include an identifier or a copy of the actual load operation to be executed. Next in flow 810, a first access to a line in a cache memory referenced by the load operation is scheduled. As an example, a scheduler capable of scheduling load buffer entries for execution out of program order schedules a first access to the line based on the load buffer entry.

In one embodiment, the first access includes a load from the line in the cache memory and a read of the state of a transaction load tracking field associated with the line in flow 815. As a first example, the line of the cache includes the transaction load tracking field, such as a transaction load tracking bit. As a result the scheduler schedules one load from the line through a corresponding port of the cache to load the cache line, and logic later isolates the transaction tracking bit. As another example, the first access includes a scheduled first load from the line in the cache memory in flow 820 and a scheduled second load from the load transaction tracking bit, which is accessible through a separate port of the cache from the line of the cache memory the transaction tracking bit corresponds to.

In flow 830, the state, which was read in flow 825, of the transaction load tracking field is stored in a filter field in the load buffer entry. Note that in the embodiment where reading the state of the transaction tracking field is scheduled on a separate port than the load from the cache line, flow 825 and flow 830 may be performed at any point after the load buffer entry is stored, such as before flow 820. Furthermore, the state of the transaction field may be stored after the load buffer entry is marked as a senior load buffer entry, upon retirement of the load operation, in flow 835. Here, upon completion of the first access or performance of the load from the line of the cache, the load operation is retired. Previously, the load buffer entry would be de-allocated after retirement in program order. In contrast, the load buffer entry is marked as a senior load buffer entry in program order. When a head load pointer is pointed at the load buffer entry and the load corresponding to the load buffer entry has completed, the head load pointer is moved to a next oldest load buffer entry that is not a senior load to mark the load buffer entry as a senior entry.

In flow 840, it is determined if the line has been accessed during a pendency of the transaction. In other words, the filter field of the load buffer entry is checked. If the state of the transaction tracking field that was stored in flow 830 represents a first default state, then it is determined that the line has not been previously loaded from during a pendency of the transaction, and a second access to the line to update the state of the load tracking field is scheduled in flow 845. In flow 850 the state of the transaction tracking field is set/updated to a second previously loaded from state to represent that the line has been accessed during a pendency of the transaction to detect subsequent accesses and conflicts.

However, if the line had been previously accessed during execution of the transaction, which resulted in the state of the transaction tracking field stored in the filter field in flow 830 to represent the second previously accessed state, then it is determined in flow 840, that the line has already been previously loaded from during execution of the transaction. In that case, in flow 855 the load buffer entry is de-allocated without having to schedule a second access, as the transaction tracking field already represents the line had been load from during a pendency of the transaction. In one embodiment, the entry is de-allocated immediately. Alternatively, the entry is de-allocated in program order, i.e. when the load buffer entry is pointed to by a head senior load pointer. As a consequence, multiple additional access to the same transaction tracking field in a cache are not redundantly scheduled, i.e. subsequent operations accessing the same line are filtered from performing unnecessary post-retire accesses.

Figure 9:
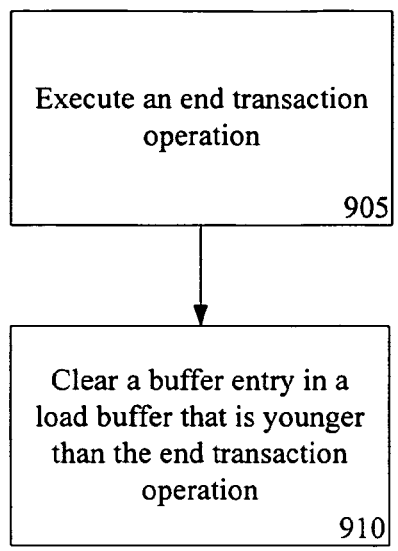
FIG. 9 illustrates an embodiment of a flow diagram for clearing filter fields in buffer entries related to operations not in a transaction, after executing an end transaction operation.

Turning to FIG. 9, an embodiment of a flow diagram for handling an end transaction instruction is illustrated. In flow 905, an end transaction operation is executed. Note that the end transaction instruction, when decoded potentially includes a store operation and/or other operations. In an out-of-order machine it is potentially not realized that an end transaction instruction has been executed until retirement of the instruction. As a consequence, buffer entries, such as load buffer entries, associated with load operations that are not part of the transaction have potentially accessed the cache and stored the state of tracking information for the transaction to be committed in a filter field. Yet, as those load operations are not part of the transaction, the tracking information is not correct, as the transaction is no longer pending. Therefore, in flow 910 filter fields in buffer entries in a load buffer that are younger than the end transaction operation are cleared to remove the incorrect state information.

Figure 10:
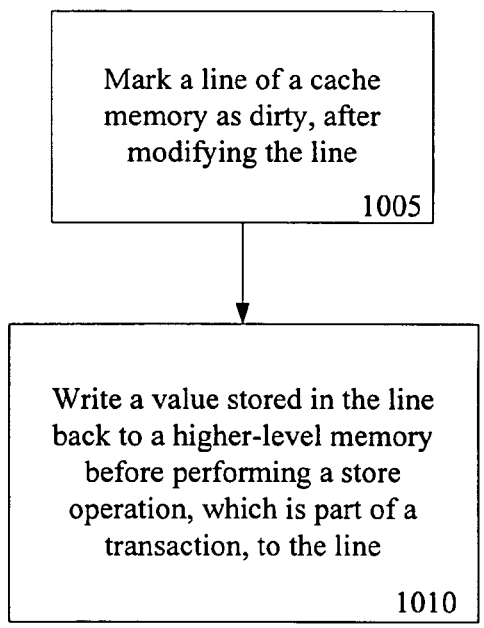
FIG. 10 illustrates an embodiment of a flow diagram for writing back a current value of a dirty cache line before performing a store operation in a transaction to the cache line.

Turning to FIG. 10, an embodiment of a flow diagram for writing back a value of a dirty cache line before performing a store operation in a transaction is illustrated. As stated above, transactional execution usually includes speculatively executing a group of instructions or operations and upon successful validation making any changes globally visible. If however, during execution, a conflict is detected, the transaction is potentially aborted and restarted. Yet, when a cache is utilized as a transactional memory, updates to the cache are tentative. Therefore, if, as in flow 1005, a line of a cache is marked as dirty, after modifying the line, i.e. the cache includes the only valid copy of the line, then before performing a store operation in a transaction, the line is written-back to a higher-level memory in flow 1010. For example, if the transactional memory is a first-level cache, the value of the line of cache is written-back to a second-level cache or a system memory.

Figure 11:
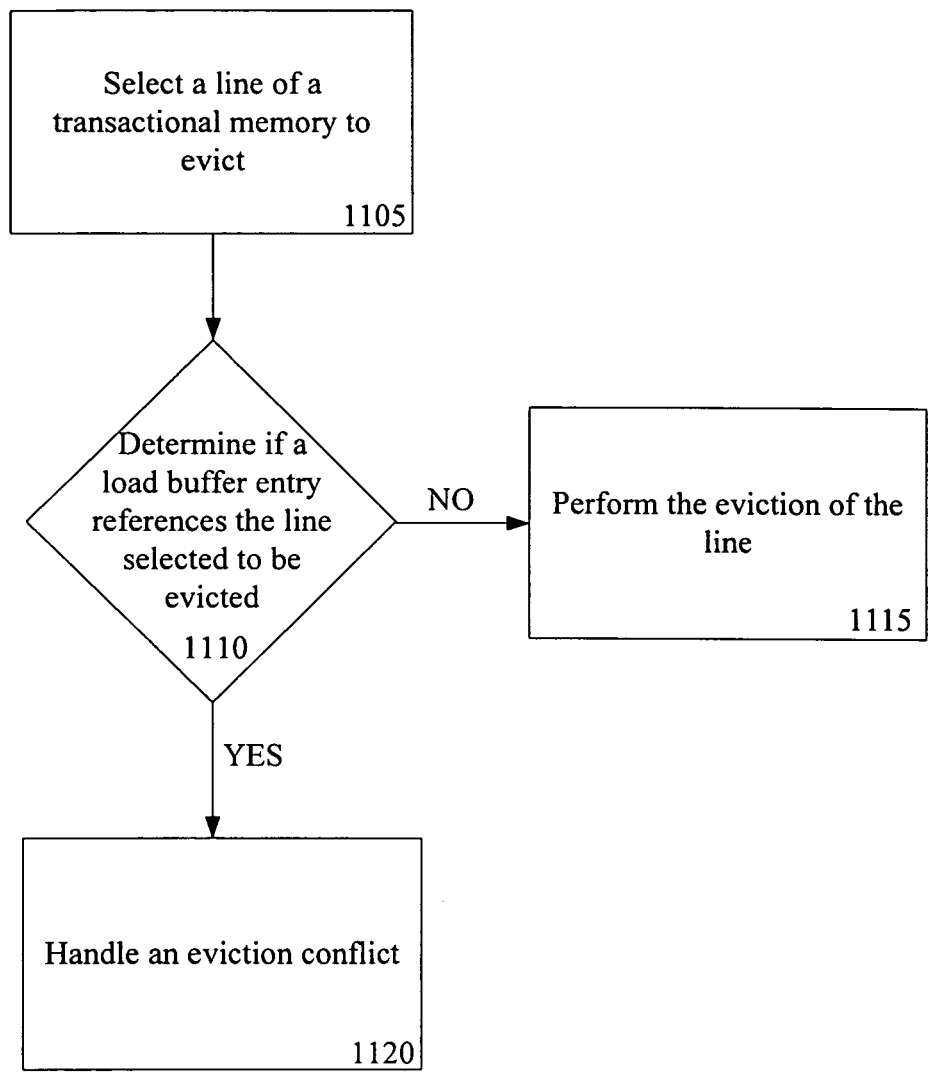
FIG. 11 illustrates an embodiment of a flow diagram for snooping a load buffer before evicting a cache line.

Next in FIG. 11, an embodiment of a flow diagram for snooping a load buffer before evicting a cache line is illustrated. In flow 1105, a line of a transactional memory is selected to evict. In one embodiment, any known or otherwise available cache replacement algorithm is used to select a line of cache to be evicted. However, as a post-retire access tracking scheme sets tracking information after retirement, i.e. when buffer entries are senior, a conflict may potentially be created by the eviction that is not yet detectable, as the transaction tracking information corresponding to the line to be evicted has not been updated.

Therefore, in flow 1110, the load buffer is snooped, i.e. it is determined if a load buffer entry in the load buffer references the line selected to be evicted. Early in the stages of the load buffer, the load buffer entry potentially includes full address information or other information referencing the line to be loaded from. Here, the references, such as tag values are compared to ensure that the line being evicted is not referenced by a load buffer entry. However, later in the stages of a load buffer the load buffer may only include set and way information to be compared. Once compared, if there is no load buffer entry that references the line to be evicted, then the eviction is performed normally in flow 1115. However, if a load buffer entry does reference the line to be evicted, then a conflict is detected and handled in flow 1120.

Handling the conflict may be done in any number of ways. In one embodiment, the load in the load associated with the load buffer entry that matched the set and way to be evicted is nuked, and the load and subsequent instructions are re-executed. In another embodiment, a user-handler is executed to handle an abort and restart of the transaction.

As illustrated above, since accesses are tracked post-retirement, spurious aborts due to data conflicts on a mispredicted path are avoided, as the instructions in the mispredicted path that are executed are not scheduled for post-retire access tracking. Furthermore, transaction tracking fields/bits are potentially implemented in separate arrays to provide separate port access to transaction tracking information from corresponding cache lines. Consequently, post-retire accessing tracking does not steal valuable access cycles from operations that are accessing the cache lines, as the post-retire accesses may be scheduled on separate ports. Furthermore, redundant post-retire accesses to the same lines within a cache in a single transaction are potentially avoided by utilizing a filter field to store tracking field information in buffer entries. Therefore, subsequent buffer entries that are to update a tracking field, which is already set, are not scheduled for post-retire accesses.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a processing element including
      a load buffer, the load buffer to hold:
         a tail load instruction entry;
         a head load instruction entry, wherein a non-senior portion of entries between the tail load instruction entry and the head load instruction entry are to include non-senior load entries; and
         a senior head load instruction entry, wherein a senior portion of entries between the head load instruction entry and the senior head load instruction entry are to hold senior load entries, wherein a senior load entry of the senior portion of entries to hold senior load entries comprises a filter field to hold a state of a load tracking field associated with a line of a memory referenced by a load operation associated with the senior load entry; and
      a scheduler to schedule a post-retire access to the line of the memory referenced by the load operation associated with the senior load entry in response to the state of the load tracking field to be stored in the filter field represents a first state, wherein the post-retire access to the line of the memory is to update the load tracking field to a second state and further wherein the first state is represented by a first logical value, and wherein the second state is represented by a second logical value.

2. The apparatus of claim 1, wherein the processing element further includes a store buffer, the store buffer to hold:
   a tail store instruction entry;
   a head store instruction entry; and
   a senior head store instruction entry, wherein a plurality of entries between the head store instruction entry and the senior head store instruction entry are to store senior hold entries.

3. The apparatus of claim 1, wherein the scheduler is to schedule the post-retire access to the line of the memory referenced by the load operation in a program order within an access scheduler priority scheme.

4. The apparatus of claim 1, wherein the tail load instruction entry is to be referenced by a tail instruction pointer, the head instruction entry is to be referenced by a head instruction pointer, and the senior head instruction entry is to be referenced by a senior head instruction pointer.

5. The apparatus of claim 1, wherein a second filter field in a load entry of the non-senior portion of load entries is cleared, in response to retiring an end transaction operation.

6. The apparatus of claim 1, wherein a value to be held in the line of the memory is to be written-back to a higher-level second memory before storing a second value to the line of the memory in response to the line of the memory being marked dirty.

7. A method comprising:
   storing a load buffer entry in a load buffer, wherein the load buffer entry is associated with a load operation of a plurality of operations grouped into a transaction;
   performing a load from a line of a transactional memory referenced by the load operation;
   marking the load buffer entry as a senior load entry in response to the load from the line of the transactional memory;
   selecting a second line of the transactional memory to be evicted during a pendency of the transaction;
   determining if a second load buffer entry in the load buffer references the second line, wherein the second load buffer entry references the second line by a set value and a way value; and
   handling an eviction conflict, if the second load buffer entry in the load buffer references the second line, wherein handling the eviction conflict is selected from a group consisting of aborting the transaction, performing a late lock acquire, and resolving the eviction conflict.

8. The method of claim 7, wherein marking the load buffer entry as a senior load entry in response to the first access to the line of the transactional memory comprises: moving a head pointer, which is currently pointing to the load buffer entry, to point to a next oldest load buffer entry, upon retirement of the load operation, wherein the load buffer entry is to be bounded by the head pointer pointing to the next oldest load buffer entry and a senior head pointer pointing to an oldest senior load entry to mark the load buffer entry as a senior load entry.

9. The method of claim 7, further comprising:
reading a tracking value associated with the line of the transactional memory from the transactional memory, upon the load from the transactional memory; and
storing the tracking value in a filter field in the load buffer entry.

10. The method of claim 9, further comprising:
scheduling an update access to the tracking value in the transactional memory in response to marking the load buffer entry as a senior load entry, if the tracking value represents that the line has not previously been loaded from during a pendency of the transaction; and
deallocating the load buffer entry in response to marking the load buffer entry as a senior load entry without scheduling the update access, if the tracking value represents that the line has previously been loaded from during a pendency of the transaction.

11. The method of claim 9, further comprising executing an end transaction operation of the plurality operations grouped into the transaction;
clearing a filter field in the load buffer entry, if the load buffer entry is younger than the end transaction operation.

12. A system including:
a processing element including a load buffer and a store buffer, wherein the load buffer comprises a load tail pointer and a load head pointer to define a pre-retire portion of the load buffer, which is to reference a plurality of pre-retire load operations, and a load senior head pointer, which along with the load head pointer, is to define a post-retire portion of the load buffer, which is to reference a plurality of post-retire load operations wherein a senior load entry within the post-retire portion of the load buffer is to hold a reference to a post-retire load operation of the plurality of post-retire load operations and a filter field, the filter field to hold a state of a load tracking field associated with a memory line referenced by the post-retire load operation, and wherein the store buffer is capable of holding store buffer entries to reference a plurality of pre-retire store operations and store buffer entries to reference a plurality of post-retire store operations; and
a memory coupled to the processing element.

13. The apparatus of claim 12, wherein the processing element further comprises a scheduler to schedule a post-retire access to the memory line referenced by the post-retire load operation in response to the state of filter field representing a first state, and wherein the scheduler is to forgo scheduling the post-retire access to the memory line in response to the state of the filter field representing a second state.

14. The apparatus of claim 13, wherein the post-retire access is to update the load tracking field associated with the memory line reference by the post-retire load operation.

15. The apparatus of claim 13, wherein the scheduler is to schedule the post-retire access to the line of the memory referenced by the load operation in a program order within an access scheduler priority scheme in response to the state of the filter field representing the first state.

* * * * *